United States Patent
Liu et al.

(10) Patent No.: US 7,215,327 B2
(45) Date of Patent: May 8, 2007

(54) DEVICE AND METHOD FOR GENERATING A VIRTUAL KEYBOARD/DISPLAY

(75) Inventors: Chen-Hao Liu, Taoyuan (TW); Chun-Jung Chen, Yunlin (TW)

(73) Assignee: Industrial Technology Research Institute, Chu-Tung, Hsinchu Hsien (TW)

( * ) Notice: Subject to any disclaimer, the term of this patent is extended or adjusted under 35 U.S.C. 154(b) by 784 days.

(21) Appl. No.: 10/420,699

(22) Filed: Apr. 23, 2003

(65) Prior Publication Data
US 2004/0125147 A1 Jul. 1, 2004

(30) Foreign Application Priority Data
Dec. 31, 2002 (TW) ............................... 91138065 A

(51) Int. Cl.
*G09G 5/00* (2006.01)
(52) U.S. Cl. ...................................... 345/168; 345/773
(58) Field of Classification Search ........ 345/156–170, 345/173–178, 773
See application file for complete search history.

(56) References Cited
U.S. PATENT DOCUMENTS
6,614,422 B1 * 9/2003 Rafii et al. .................. 345/168
6,710,770 B2 * 3/2004 Tomasi et al. .............. 345/168
2002/0061217 A1 * 5/2002 Hillman et al. ............. 400/489
2002/0171633 A1 * 11/2002 Brinjes ....................... 345/168
2005/0024324 A1 * 2/2005 Tomasi et al. .............. 345/156

* cited by examiner

Primary Examiner—Vijay Shankar
(74) Attorney, Agent, or Firm—Birch, Stewart, Kolasch & Birch, LLP

(57) ABSTRACT

The specification discloses a device and method for generating a virtual keyboard/display. By means of optical scanning, a virtual display/keyboard is generated on a physical plane through a scan laser switch. Using the code reading technology, the key position entered by the user can be read and transmitted to a computer. The disclosed device includes a first laser emitter, a second laser emitter, and a laser receiver. The disclosed method has the following steps. First, the first laser emitter performs a surface scan to generate the patterns of the keyboard/display. The second laser emitter simultaneously generates a first reflective beam and a second reflective beam when the user enters input using the virtual keyboard. Finally, the laser receiver receives the first and second reflective beams, thereby obtaining the signals entered by the user.

3 Claims, 4 Drawing Sheets

DEVICE AND METHOD FOR GENERATING A VIRTUAL KEYBOARD/DISPLAY

BACKGROUND OF THE INVENTION

1. Field of Invention

The invention pertains to a device and method for generating a virtual keyboard/display and, in particular, to a device and method for generating a virtual keyboard/display through the surface and line scans of laser beams.

2. Related Art

A rising trend in electronic products is to be light, compact, quiet, and easy to carry. However, as set by visual limit and human mechanics, the input device and display cannot be minimized indefinitely. In practical uses, most users prefer to have larger input devices and display devices. Although there exist other equivalent input devices, such as hand-written panels, voice analyzers, and light pens, most users are still used to keyboard input. It is thus very hard to replace the keyboard with other means. Recently, virtual keyboards, which are designed particularly for conventional users, have been proposed. They also have the advantages of having no noise, occupying no space, and being easy to carry. The introduction of the virtual keyboards utilizes the digital micro mirror display technology. The patterns of the keyboard and display are produced by projection. Two beams of laser and two receivers are required to detect the reflection angles of light reflected by fingers. Combining the angles measured by the two photo sensors, the system can determine the position of the entered key. A drawback is that the two laser emitters and two photo receivers consume more electrical power, which is not ideal for long-term uses.

SUMMARY OF THE INVENTION

In view of the foregoing, the invention provides a device and method for generating a virtual keyboard/display. An objective is to use a visible laser beam and an invisible laser beam to produce the patterns of a keyboard/display and to simulate the functions of the keyboard/display. The means generate the desired functions are simplified and more energy can be saved To achieve the above objective, the disclosed device includes a first laser emitter, a second laser emitter, and a laser receiver.

The disclosed method has the following steps. First, the first laser emitter performs a surface scan to generate the patterns of the keyboard/display. The second laser emitter simultaneously generates a first reflective beam and a second reflective beam when the user enters input using the virtual keyboard. Finally, the laser receiver receives the first and second reflective beams, thereby obtaining the signals entered by the user.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1:
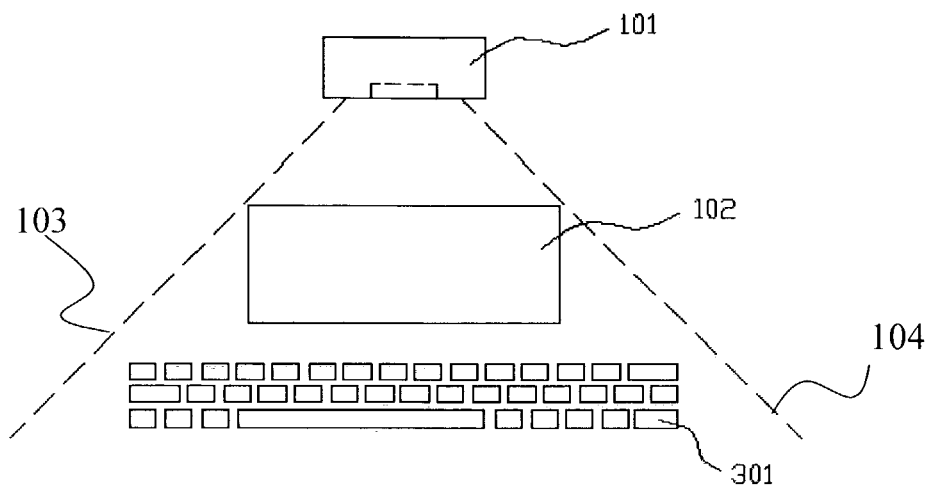
FIG. 1 is a top view of the disclosed device for generating virtual keyboard/display.
Figure 2:
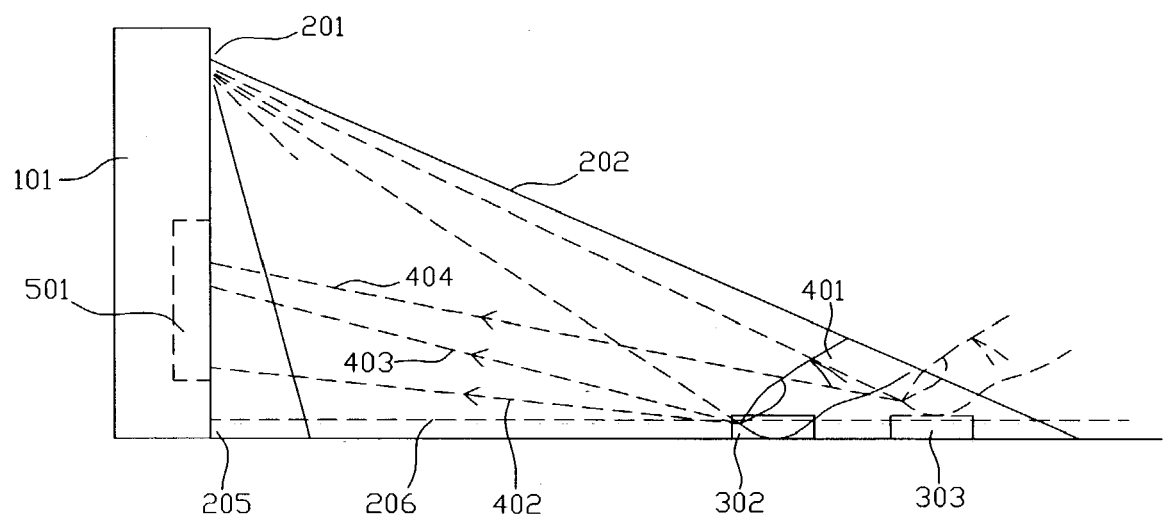
FIG. 2 is a side view of the disclosed device for generating virtual keyboard/display.
Figure 3:
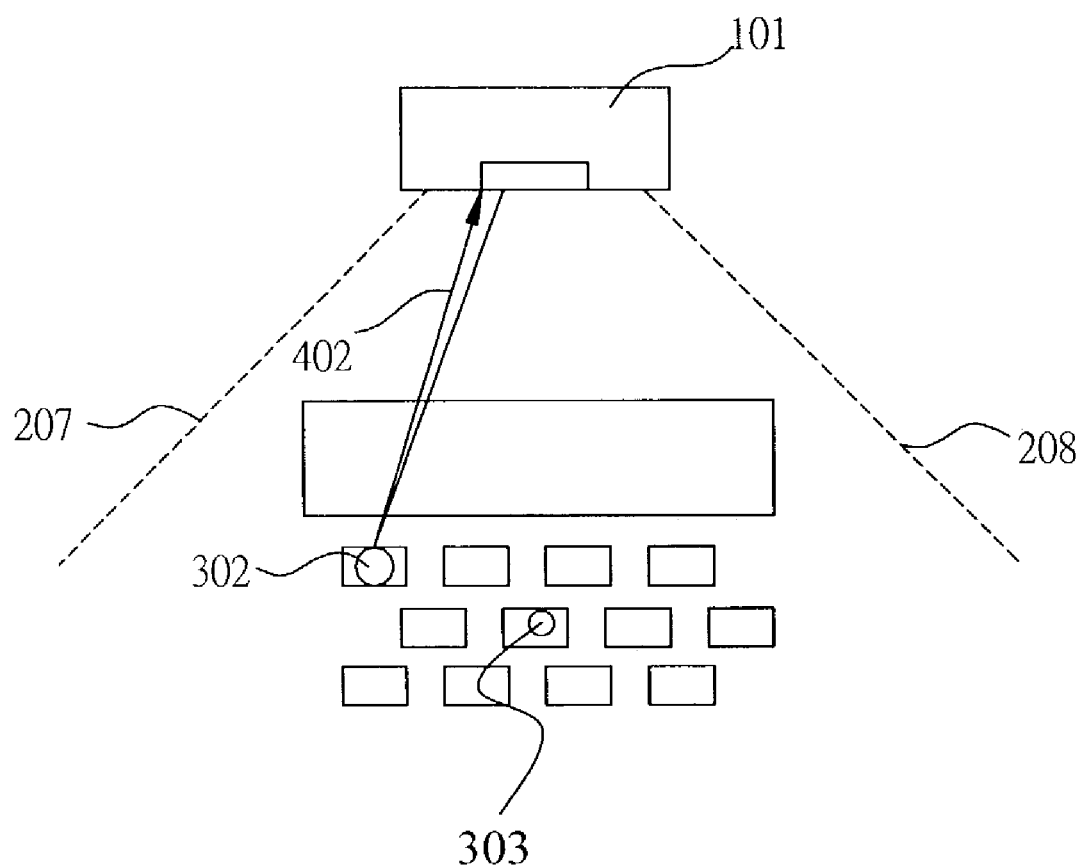
FIG. 3 is a schematic view of the invisible laser scanning according to the invention.

With simultaneous reference to FIGS. 1, 2 and 3, the invention discloses a scanning and sensing device 101, which has both the scanning and sensing functions. It is disposed on a physical plane that can display colors. It can generate a keyboard 301/display 102 pattern and the keyboard 301 can be used for input. The scanning and sensing device 101 contains: a first laser emitter 201, a second laser emitter 205, and a laser receiver 501.

(1) The first laser emitter 201 generates light intensity modulation through the on and off of a switch. The scanning means is that the laser beam starts from the first initial scanning position 202 under the scanning and sensing device 101, performing a line scan from the initial scanning point 103 to the final scanning point 104. Afterwards, the laser beam goes back to the initial scanning point 103 on the left-hand side and moves forward (away from the user) by a distance of a light spot. The same line scan is then performed until the laser beam moves to the scanning and sensing device 101. The scanning rate is more than 30 screens per second (covering the display 102 and the keyboard 301) to generate the patterns of the keyboard 301/display 102 on the physical plane. When the user uses the keyboard 301 for input, a first reflective beam 403, 404 is generated.

(2) The second laser emitter 205 generates an invisible laser beam 206 and scans at a small distance (0.3 cm to 0.8 cm) in parallel with the physical plane. The scan range is between the invisible laser initial scanning point 207 and the invisible laser final scanning point 208 (see FIG. 4). The angular speed of the line scan is the same as that of the first laser emitter. Therefore, when the user uses the keyboard 301 for input, the reflection from his or her fingers produces a second reflective beam 402.

(3) The laser receiver 501 receives the first reflective beam 403, 404 and the second reflective beam 402 when the user uses the keyboard 301 for input, thereby obtaining the input signals.

The device for generating virtual keyboard/display further comprises two laser diodes, first rotational multi-face mirror, beam splitter and second rotational multi-face mirror; the two laser diodes simultaneously emit two beams traveling in the same direction but having different wavelengths; the first rotational multi-face mirror reflects the beams so as to let the beams with a scan angle; the beam splitter produces an upper beam and a lower beam from the beams, the lower beam performing a horizontal scan through the first rotational multi-face mirror and the beam splitter; and the second rotational multi-face mirror reflects the upper beam to perform a surface scan.

Figure 4:
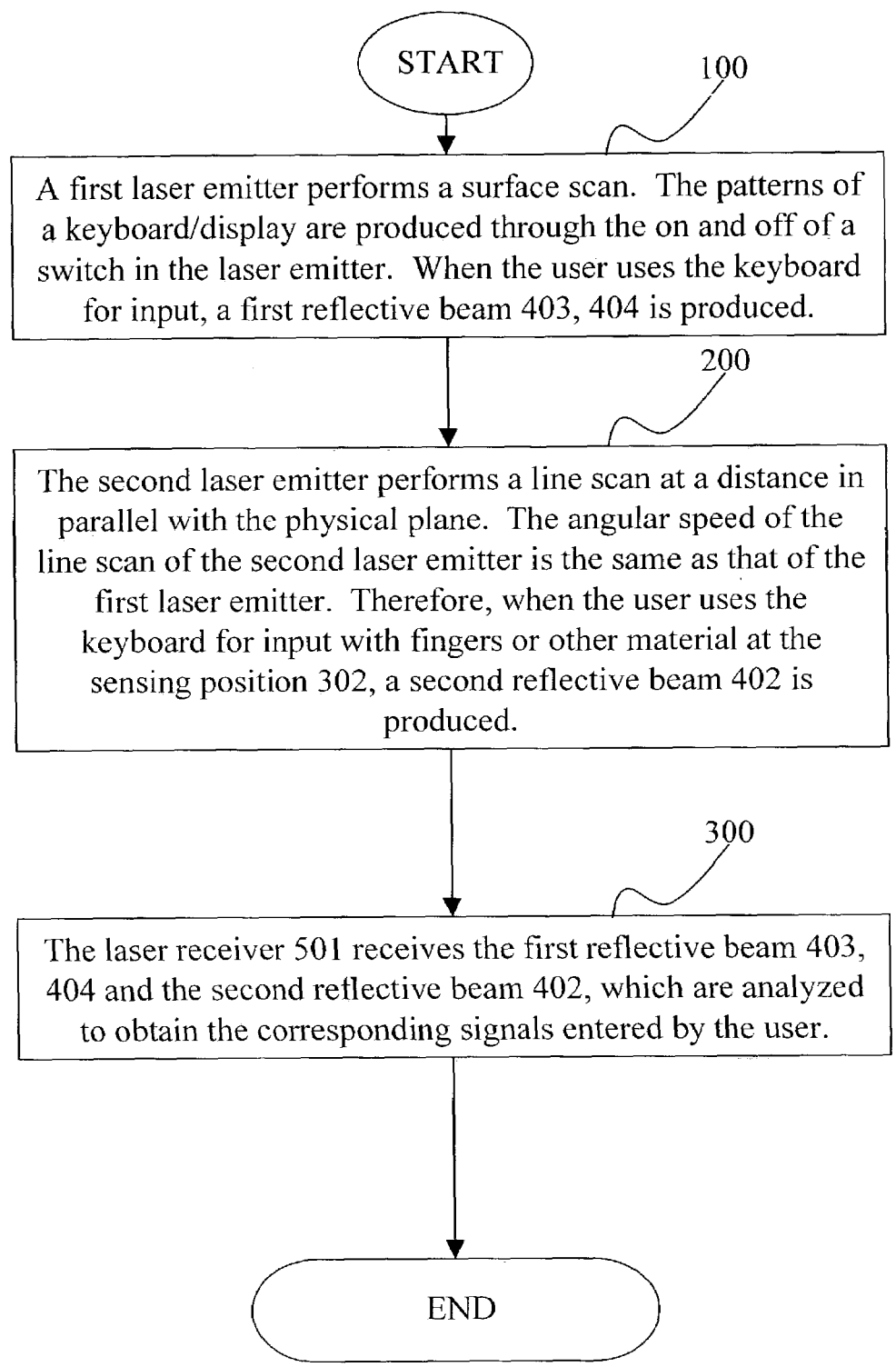
FIG. 4 is a flowchart of the disclosed method for generating virtual keyboard/display.

Please refer to FIG. 4, which we use to explain the disclosed method. First, a first laser emitter performs a surface scan. The patterns of a keyboard/display are produced through the on and off of a switch in the laser emitter. When the user uses the keyboard for input, a first reflective beam 403, 404 is produced (step 100). The second laser emitter performs a line scan at a distance in parallel with the physical plane. The angular speed of the line scan of the second laser emitter is the same as that of the first laser emitter. Therefore, when the user uses the keyboard for input with fingers or other material at the sensing position 302 and 303, a second reflective beam 402 is produced (step 200). Finally, the laser receiver 501 receives the first reflective beam 403, 404 and the second reflective beam 402, which are analyzed to obtain the corresponding signals entered by the user (step 300). The first reflective beam 403, 404 and the second reflective beam 402 are seperated by the beam frequency. The signals are then sent to a computer.

Figure 5:
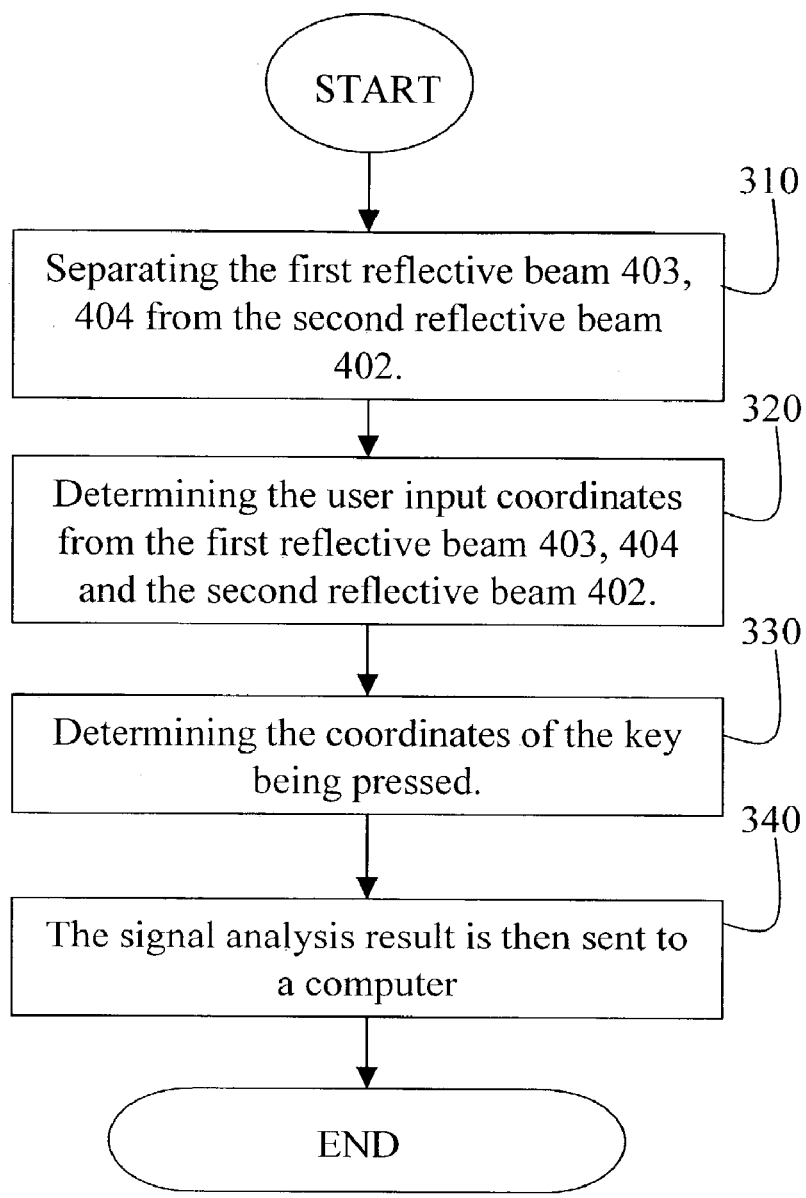
FIG. 5 is a flowchart of the analysis procedure according to the invention.

We use FIG. 5 to explain the detailed procedure of the analysis process. When the user puts fingers or other input medium (such as a pen) at the sensing position 302, a first reflective beam 403, 404 and a second reflective beam 402 are produced. Because the sensing position 303 is not pressed by the figures illustrated as dot lines in the FIG.2, the second reflective beam is not produced. After receiving the reflective beams, the laser receiver 501 separates the first reflective beam 403, 404 from the second reflective beam 402 (step 310) by the beam frequency. The circuit is designed to determine the user input coordinates from the first reflective beam 403, 404 and the second reflective beam 402 (step 320). It calculates the time difference between the initial scanning point 207 and the final scanning point 208 of the invisible laser beam, and compares with the time difference of the first reflective beam 403, 404 from the initial scanning point 103. By comparing the two time differences, the processor can determine the coordinates of the key being pressed (step 330). The signal analysis result is then sent to a computer(step 340), completing the input action.

EFFECTS OF THE INVENTION

The disclosed device for generating virtual keyboard/display does not have noise, does not occupy space, and is easy to carry, which is ideal for keyboard users. There is no need to worry about dusts piling on the keyboard.

Certain variations would be apparent to those skilled in the art, which variations are considered within the spirit and scope of the claimed invention.

What is claimed is:

1. A device for generating virtual keyboard/display on a physical plane that displays colors for producing a keyboard/display pattern and for entering input data, the device comprising:
   a first laser emitter emitting a visible laser beam, wherein light intensity modulation is made by switching the on and off of a switch of the first laser emitter and the keyboard/display pattern is produced by a surface scanning process, so as to generate a first reflective beam when a user uses the keyboard pattern for inputting signal;
   a second laser emitter emitting an invisible laser beam, wherein the second laser emitter performs a line scan at a distance in parallel with the physical plane and angular speed of the line scan is the same as that of the first laser emitter, so as to generate a second reflective beam when the user uses the keyboard pattern for inputting signal;
   a laser receiver receiving the first reflective beam and the second reflective beam to obtain the inputting signal;
   two laser diodes simultaneously emitting two beams traveling in the same direction but having different wavelengths;
   a first rotational multi-face mirror reflecting the beams so as to let the beams with a scan angle;
   a beam splitter producing an upper bean and a lower beam from the beams, the lower beam performing a horizontal scan through the first rotational multi-face mirror and the beam splitter; and
   a second rotational multi-face mirror reflecting the upper beam to perform a surface scan.

2. The device of claim 1, wherein the distance ranges from 0.3 cm to 0.8 cm.

3. The device of claim 1, wherein the first laser emitter also emits an invisible laser beam for producing the keyboard/display patterns through the surface scan, a user uses a filter to observe the produced image, and a first reflective beam of the invisible laser beam is produced when the user uses the keyboard for input.

\* \* \* \* \*